United States Patent Office 2,887,512
Patented May 19, 1959

2,887,512

OXIDATION OF ACETALS

James C. Martin and James Powell Hawk, Kingsport, Tenn., assignors to Eastman Kodak Company, Rochester, N.Y., a corporation of New Jersey No Drawing. Application October 29, 1956
Serial No. 618,676

4 Claims. (Cl. 260—530)

This invention relates to a process for the oxidation of acetals to produce carboxylic acids. More particularly, it relates to a process for the liquid phase catalytic oxidation of acetals.

The oxidation of acetals to carboxylic acids has been carried out in the past using oxygen and various solvents to bring about the oxidation. For instance, U.S. Patent No. 2,583,112 discloses the use of oxygen and formic acid to bring about the oxidation of acetals. However, this method requires the use of 95 percent formic acid which is relatively expensive, and thus uneconomical since a large amount of this formic acid is converted to formic esters. A catalyst is recommended, one which is soluble in the solution of acetal and formic acid, such as a salt of an organic acid and of a heavy metal such as cobalt, lead, or manganese.

U.S. Patent No. 2,497,889 describes a process for the oxidation of ethers and acetals to the corresponding acid by the use of a cobalt catalyzed-aldehyde-activated procedure. However, the yields are quite low.

The oxo process, wherein an olefin is converted to an acetal by reaction with carbon monoxide and hydrogen in the presence of methyl or ethyl alcohol and a cobalt catalyst, is a convenient source of acetals. Accordingly it has been desired to have an efficient process for converting these acetals to carboxylic acids. We have discovered a process which uses a different method from the prior art processes, yet combines high yields with relatively inexpensive reagents.

One object of our invention is to provide an economical process for converting acetals to their corresponding acids by an oxidation procedure. Another object of this invention is to provide a method for converting ester-acetals to their corresponding dibasic acids in good yields. A still further object is to provide a process whereby acetals may be converted to acids in a single operation. Another object of our invention is to provide a process for converting acids to acetals using acidic ion exchange resins as catalysts.

The above objects are obtained by charging the acetal, a strong acid catalyst such as an ion exchange resin or mineral acid and a fatty acid solvent such as acetic or butyric acid into an oxidation column. This mixture is heated, and air or oxygen is passed in continuously at the bottom of the column, while water is added at the top of the column. The acetals which may be used in the practice of our invention are the unsubstituted aliphatic mono and poly acetals, acetals of aromatic aldehydes, acetals of heterocyclic aldehydes that do not contain nitrogen in the ring, and the acetals described above when containing the other functional groups —COOH, —OH, —COOR.

The following examples are intended to illustrate the nature of our invention but are not intended to limit it in any way:

Example 1

One hundred thirty grams (0.7 mole) of heptaldehyde, diethyl acetal, 400 ml. glacial acetic acid and 1 ml. 95 percent sulfuric acid were charged into a glass oxidation column and heated at 70° C. Air was introduced at the bottom of the column at the rate of 3 cubic feet per hour. 25 ml. of water were added at the top of the column over a 4-hour period. The oxidation was continued for a total of 5½ hours. A considerable amount of material was swept out of the column by the air stream and caught in a cold trap. This trapped material, after drying with sodium sulfate, gave 56 percent of the theoretical ethyl acetate that could be formed as a byproduct. The main reaction reaction mixture was discharged from the column; the sulfuric acid was neutralized, and then distilled at atmospheric pressure using a 12-inch column packed with protruded packing. We obtained 46.6 grams of enanthic acid boiling at 218° C., $n_D^{20}$ —1.4231 and neutralization equivalent (theoretical) —130 (found) 131.3. This is a yield of 52 percent.

Example 2

One hundred thirty grams (0.7 mole) of heptaldehyde, diethyl acetal, 400 ml. of glacial acetic acid, and 30 grams of Amberlite IRA–120 ion exchange resin (this was weighed while wet with acetic acid) were charged into an oxidation column as described in Example 1 and heated at 70° C. Air was fed in at 3 cubic feet per hour and 25 ml. of water were added over a 4-hour period. The reaction was continued for a total of 6 hours. The mixture from the column was filtered to remove the resin, and the filtrate was distilled at atmospheric pressure to give 67.0 grams of enanthic acid. This is a yield of 74 percent.

Example 3

One hundred thirty grams (0.7 mole) of heptaldehyde, diethyl acetal, 400 ml. of glacial acetic acid, 20 grams of Amberlite IRA–120 and 5 grams of cobalt stearate were charged into the oxidation column described in Example 1 and heated at 70° C. Air was fed in at 3 cubic feet per hour and 25 ml. of water were added over a 1½-hour period. The solution had a dark green color indicating an active catalyst. After two hours the color changed to pink, and the reaction was stopped at this point. Working up the product in the manner of Example 2, a 71 percent yield of enanthic acid was obtained.

Example 4

One hundred twenty grams (0.55 mole) of the diethyl acetal of ethyl glutaraldehyde, 400 ml. of glacial acetic acid and 1 ml. 95 percent sulfuric acid were charged into an oxidation column as described in Example 1, then heated to 75° C. Air was fed in at 4 cubic feet per hour, and 30 grams of water were added over an 8-hour period. The reaction mixture was discharged from the column, the sulfuric acid was neutralized, and the solution was distilled under vacuum. A 60 percent yield of product with boiling point of 135–150° at 1 mm. was obtained. This distillate was recrystallized from benzene to yield pure glutaric acid of melting point 95–96° C. The yield of purified glutaric acid was 53%.

Example 5

One hundred eighteen grams (1.0 mole) of n-butyraldehyde, dimethyl acetal, 400 ml. dioxane, 25 grams of Amberlite IRA–120 (wet with dioxane) and 5 grams of cobalt stearate were charged into an oxidation column as described in Example 1, then heated to 60° C. Oxygen was fed in at 0.5 cubic feet per hour, and 35 grams of water were introduced over a 2-hour period. The oxidation was completed after 3 hours. Upon working up the product in the usual manner, a good yield of a mixture of n-butyric acid and its methyl ester was obtained.

Example 6

One hundred six grams (1.0 mole) benzaldehyde, diethyl acetal, 400 ml. propionic acid, 10 grams of Amberlite IRA-120 and 5 grams of cobalt naphthionate, when reacted according to the conditions in Example 3 gave a good yield of benzoic acid.

Example 7

One hundred forty-two grams (1.0 mole) of furfural, dimethyl acetal, 400 ml. butyric acid, 15 grams of Amberlite IRA-120 and 5 grams of cobalt stearate when reacted according to condtions in Example 3 gave furoic acid.

Our process may be operated using a strong acid catalyst such as either a mineral acid or an acidic ion exchange resin such as Amberlite IRA-120, Permutit Q or Dowex 50 which are sulfonated polystyrene-divinyl benzene copolymers. Other ion exchange resins which may be used are acidic ion exchange resins such as those prepared by the sulfonation of a phenol-formaldehyde resin, the sulfonation of a polystyrene, the sulfonation of the copolymer of methacrylic acid with divinyl benzene and similar ion exchange resins. An acidic ion exchange resin is preferred in our process, inasmuch as we obtain better yields using this catalyst and find that it is easier to use. A cobalt catalyst, the cobalt salt of a fatty acid, may be used in the oxidation, but it is not essential to the functioning of this process. The oxidizing gas used may be air or oxygen, with air being preferred for economic reasons. The process may be run at atmospheric pressure or under several atmospheres of pressure.

We prefer to run the reaction at a temperature in the range of 40-100° C. The solvents that may be used in the invention are the lower aliphatic carboxylic acids, with the exception of formic acid; such acids are acetic, propionic, butyric and iso-butyric. This permits the alcohol that is formed to be taken out of the system as the ester of the acid used.

Our process concerns the production of carboxylic acids from acetals of the formula $RCH(OR')_2$ into acids of the formula $RCOOH$, in which formula R is alkyl with or without another functional group, or aryl with or without another functional group. R' is alkyl.

The term "strong acid catalyst" is intended herein to refer to mineral acids and acidic ion exchange resins.

We claim:

1. A process for converting the diethyl acetal of ethyl glutaraldehyde to glutaric acid comprising charging the acetal dissolved in glacial acetic acid and a strong acid catalyst into an oxidation column, heating the mixture to a temperature within the range of 40-100° C., and passing molecular oxygen in counter-current flow through the solution while adding water to the solution.

2. A process for converting an acetal of the general formula $RCH(OR')_2$ wherein R is an alkyl radical and R' is a lower alkyl radical into an acid of the general formula $RCHOOH$ which comprises dissolving the acetal in a fatty acid solvent selected from the class consisting of glacial acetic, propionic, butyric and isobutyric acids adding a strong acid catalyst, heating the mixture to a temperature of 40-100° C. and passing molecular oxygen into the resultant solution while adding water to the solution.

3. A process for converting an acetal of the general formula $RCH(OR')_2$ wherein R is an alkyl radical and R' is a lower alkyl radical into an acid of the general formula $RCOOH$ which comprises charging the acetal dissolved in glacial acetic acid and a strong acid catalyst into an oxidation column, heating the mixture to a temperature of 40-100° C., passing molecular oxygen continuously through the solution in counter-current flow while adding water to the solution.

4. A process for converting an acetal selected from the group consisting of the diethyl acetal of heptaldehyde, the diethyl acetal of ethyl glutaraldehyde, the diethyl acetal of N-butyraldehyde, the diethylene acetal of benzaldehyde and the dimethyl acetal of furfural which comprises dissolving the acetal in a fatty acid solvent selected from the class consisting of glacial acetic acid, propionic, butyric and isobutyric acids, adding a strong acid catalyst, heating the mixture to a temperature of 40-100° C., and passing molecular oxygen through the resultant solution while adding water to the solution.

References Cited in the file of this patent

UNITED STATES PATENTS

| | | |
|---|---|---|
| 1,580,137 | Hancock | Apr. 13, 1926 |
| 2,245,528 | Loder | June 10, 1941 |
| 2,497,889 | Hull | Feb. 21, 1950 |
| 2,583,112 | McKeever | Jan. 22, 1957 |

OTHER REFERENCES

Ser. No. 385,019, Guinot (A.P.C.), published Apr. 20, 1943 (abandoned).

Fieser et al.: Organic Chemistry, page 216 (1950).

Rodd: Chemistry of Carbon Compounds, vol. IIIA, page 515, 1954.

UNITED STATES PATENT OFFICE

CERTIFICATE OF CORRECTION

Patent No. 2,887,512 May 19, 1959

James C. Martin et al.

It is hereby certified that error appears in the printed specification of the above numbered patent requiring correction and that the said Letters Patent should read as corrected below.

Column 2, line 48, and column 4, line 26, for "glutaraldehyde", each occurrence, read -- glutaraldehydate --; column 4, line 27, for "N-butyraldehyde, the diethylene" read -- n-butyraldehyde, the diethyl --.

Signed and sealed this 16th day of August 1960.

(SEAL)

Attest:

KARL H. AXLINE
Attesting Officer

ROBERT C. WATSON
Commissioner of Patents